Oct. 31, 1967   J. MOSIER   3,350,626
VOLTAGE REGULATOR
Filed May 4, 1964

INVENTOR.
JACQUES MOSIER
BY John R. Faulkner
Keith L. Zerschling
ATTORNEYS

United States Patent Office 3,350,626
Patented Oct. 31, 1967

3,350,626
VOLTAGE REGULATOR
Jacques Mosier, Ypsilanti, Mich., assignor to Ford Motor Company, Dearborn, Mich., a corporation of Delaware
Filed May 4, 1964, Ser. No. 364,595
12 Claims. (Cl. 322—73)

ABSTRACT OF THE DISCLOSURE

A voltage regulator is disclosed for maintaining the rectifier output voltage of an alternator below a predetermined level. An oscillator, which provides the gating pulse to a controlled rectifier to turn the same on to allow a voltage to be applied to the control winding of the alternator, has a control circuit associated therewith which functions to turn off the oscillator when the rectified voltage output of the alternator exceeds a predetermined level. When the oscillator is turned off, a voltage cannot be applied to the winding of the alternator.

---

Figure 2:
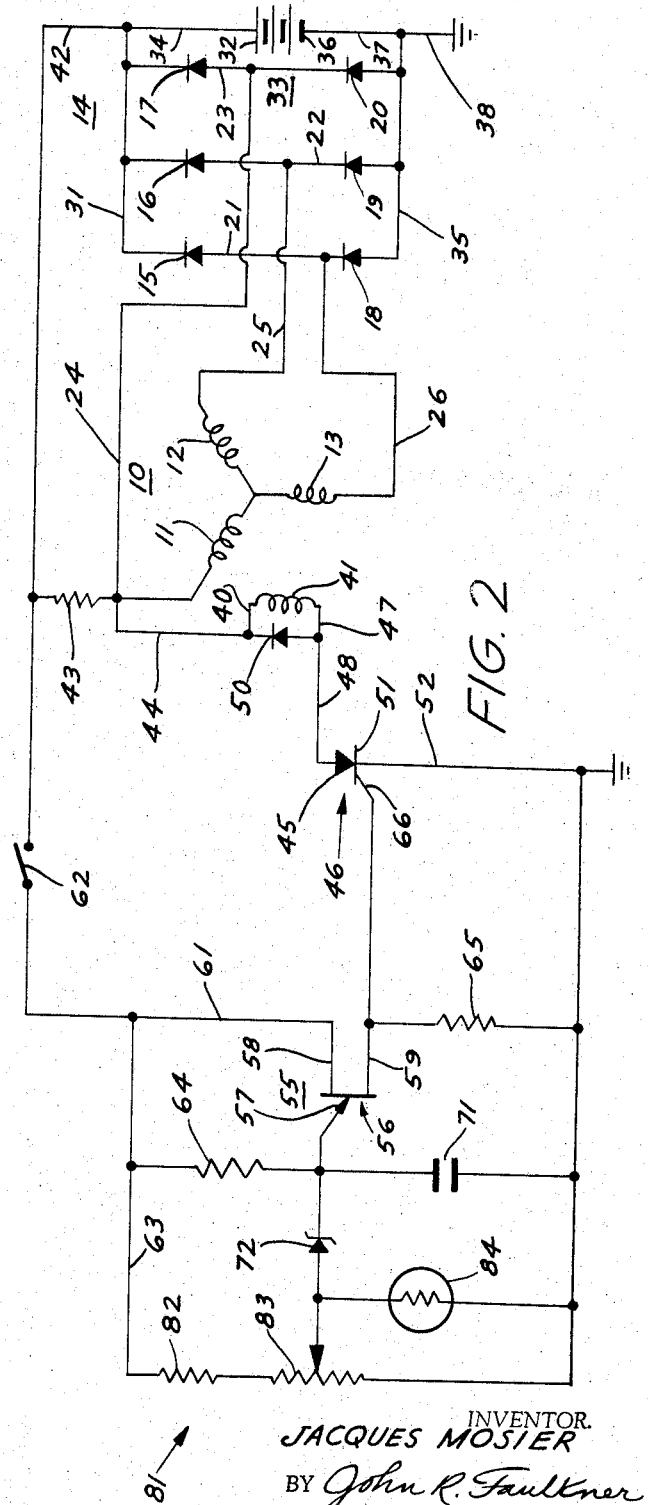

This invention relates to a voltage regulator and more particularly to a solid state voltage regulator that may be employed with the generating system of an automotive vehicle.

It is of the utmost importance that voltage regulators employed with automotive generating systems be produced with maximum quality and reliability and with minimum cost. Solid state voltage regulators, it is believed, offer maximum reliability because there are no moving parts involved as there are in conventional electromechanical regulators. The cost of certain of these solid state regulators, however, has been higher than is desired for automotive vehicle applications.

The present invention provides a highly reliable and inexpensive solid state or semiconductor voltage regulator that may be employed to regulate the output voltage of an automotive vehicle alternator. This voltage regulator employs a controlled rectifier, preferably of the silicon type, that is connected in circuit with the field winding of the alternator to control the field excitation. Means are provided to periodically apply a voltage to the controlled rectifier output circuit that will permit conduction of the controlled rectifier provided the proper signal has been applied to its control electrode. This voltage is periodically applied by a half wave rectified voltage taken from the output windings of the alternator. A relaxation oscillator, preferably in the form of a unijunction transistor circuit, is employed to periodically apply the proper voltage to the control electrode of the controlled rectifier to provide conduction of the controlled rectifier during the time that the voltage applied to the output circuit is of the proper level and polarity.

A zener diode connected to the input circuit of the relaxation oscillator or unijunction transistor circuit senses the direct current output voltage of the alternator. When this voltage rises above a prescribed level, the relaxation oscillator ceases conduction and thus ceases to apply the proper control voltage to the control electrode of the controlled rectifier. This causes the controlled rectifier to cease conduction and as a result the field excitation of the alternator is reduced. When the output voltage of the alternator falls below the desired level, the relaxation oscillator or unijunction circuit again oscillates and provides the proper control voltage to the control electrode of the controlled rectifier to permit it to conduct and to again energize the field winding of the alternator at the proper level.

An object of the invention is the provision of a reliable and inexpensive solid state voltage regulator.

Another object of the invention is the provision of a semiconductor voltage regulator for an alternator that employs inexpensive components and that is reliable in its operation.

Figure 1:
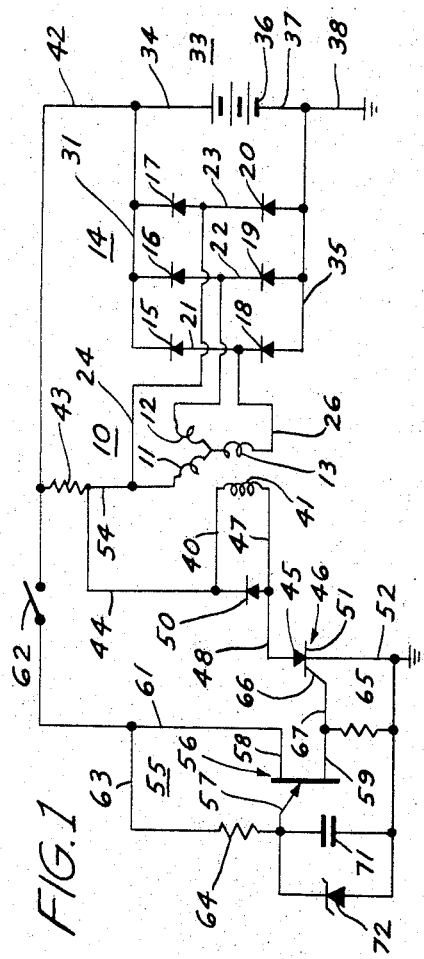

Other objects and attendant advantages of the present invention will become more readily apparent as the specification is considered in connection with the attached drawing in which:

FIGURE 1 is a circuit diagram of one embodiment of the invention, and
FIGURE 2 is a circuit diagram of another embodiment of the invention.

Referring now to the drawing in which like reference numerals designate like parts throughout the several views thereof, there is shown in FIGURE 1 an electrical generator in the form of an alternator 10 that has output windings 11, 12 and 13 connected to a full wave rectifier 14. The full wave rectifier 14 is comprised of diodes 15, 16, 17, 18, 19 and 20. A lead 21 connects the diodes 15 and 18, a lead 22 connects diodes 16 and 19, and a lead 23 connects diodes 17 and 20. A lead 24 connects output winding 11 with the lead 23, a lead 25 connects output winding 12 with lead 22, and a lead 26 connects output winding 13 with lead 21.

The full wave rectifier 14 includes a positive terminal 31 connected to the anodes of diodes 15, 16 and 17 and to the positive terminal 32 of electrical storage battery 33 through a lead 34. The negative terminal 35 of full wave rectifier 14 is connected to the cathodes of diodes 18, 19 and 20 and to negative terminal 36 of electrical storage battery 33 through a lead 37. The negative terminal 35 of the full wave rectifier 14 and the negative terminal 36 of the battery 33 are connected to ground through a lead 38.

One terminal of field winding 41 of the alternator 10 is connected to the positive terminal 31 of the full wave rectifier 14 and the positive terminal 32 of the storage battery 33 through lead 42, resistor 43, lead 44 and lead 40. The other terminal of the field winding 41 is connected to one output terminal 45, the cathode, of a controlled rectifier 46, preferably a silicon controlled rectifier, through a lead 47 and a lead 48. A diode 50, preferably constructed of silicon, is connected across the field winding 41 by being connnected to leads 40 and 47. The anode 51 or other output terminal of the controlled rectifier 46 is connected to ground through a lead 52. It can be seen, therefore, that the output circuit, including the anode 51 and cathode 45 of the controlled rectifier 46, is connected in series with the field winding 41 and that the controlled rectifier 46 will control the flow of energy through the field winding 41.

The output winding 11 and lead 24 of the alternator 10 are connected to the lead 44 through a lead 54, thus connecting the output winding 11 and the two diodes 17 and 20 to the field winding 41 and the controlled rectifier 46. The purpose of this connection is to apply a half wave rectified voltage waveform from the alternator 10 to the field winding 41 and the controlled rectifier 46 as will be explained more fully subsequently.

An oscillator circuit, preferably in the form of a relaxation oscillator 55, is connected in circuit with the controlled rectifier 46, the rectifier 14 and the battery 33 to control the conduction of the controlled rectifier 46 as a function of the output voltage of the alternator 10 present at the rectifier 14. This relaxation oscillator 55 includes a unijunction transistor 56 having an emitter 57, a first base 58, and a second base 59. The first base 58 is connected to the positive terminal 31 of the rectifier 14 and the positive terminal 32 of the battery 33 through lead 61, a switch 62 and the lead 42. The emitter 57 is connected to the lead 61 through a lead 63 and a resistor 64, while the second base 59 is connected to ground through a resistor 65 and is also connected to the control or gate electrode 66 of the controlled rectifier 46 through a lead 67. The emitter 57 is also coupled to ground through a capacitor 71 and a zener diode 72 that are connected in parallel.

The relaxation oscillator 55 is used to furnish the initiating or control signal for the controlled rectifier 46. As will be discussed more fully subsequently, the controlled rectifier is turned off every cycle of the alternator's output by the reduction of the half rectified waveform applied from the winding 11 through the lead 54, 44, 40, field winding 41, lead 47 and lead 48, falling to zero, and by the reversal of polarity occurring in the field winding 41 as this voltage falls to zero.

In the unijunction transistor 56, the emitter 57 appears open when the ratio of the voltage difference between the emitter 57 to second base 59 to the voltage difference between the first base 58 to second base 59 voltage is less than a constant N. This constant is generally in the range of .55 to .75. When this ratio is equal or greater than N, the emitter 57 to second base 59 circuit exhibits a negative resistance approaching a short circuit and this permits the capacitor 71 that has been charged through the resistor 64 to discharge through the emitter 57, second base 59 and resistor 65. This raises the potential of the control electrode 66 of the controlled rectifier 46 to the point where it will conduct provided a proper voltage exists across the output electrodes 45 and 51 of the controlled rectifier 46.

Thus, in operation of the relaxation oscillator 55, the capacitor 71 is charged through the resistor 64 from the battery 33 and the rectifier 14. When the voltage on the capacitor 71 reaches a certain proportion of the total voltage appearing across the two bases 58 and 59 of the unijunction transistor 56, the unijunction transistor 56 fires and the capacitor discharges through the emitter 57 and second base 59 of the unijunction transistor 56 and the resistor 65 thereby applying a positive pulse to the control electrode 66 of the controlled rectifier 46. When the capacitor 71 has been discharged, the voltage on the emitter 57 disappears and the unijunction transistor 56 again goes into its nonconducting state in which the circuit between the emitter 57 and the second base 59 appears open. The capacitor 71 again charges through the resistor 64, and the above described operation repeats thereby providing the relaxation oscillator operation.

The zener diode 72 limits the maximum voltage on the capacitor 71 and the emitter 57, thus providing a control or reference element for limiting the voltage output of the alternator 10. As long as the voltage appearing on the lead 61 and the first base 58 is less than $1/N$ times the zener voltage of the zener diode, operation is normal and the relaxation oscillator 55 applies positive pulses to the control electrode 66 of controlled rectifier 46 to permit it to conduct. As a result, the output voltage of the alternator 10 at rectifier 14 energizes the field winding 41 by means of the half wave rectified voltage from output winding 11 present at the lead 54. However, when the voltage appearing on the lead 61 that is directly connected to the positive terminal 31 of the rectifier 14 through the lead 42 and switch 62 exceeds $1/N$ times the zener voltage, the oscillations cease.

For example, if it is desired to limit the direct current output voltage of the alternator 10 to 14 volts and the zener breakdown voltage of the zener diode 72 is set for 7 volts, then the zener diode limits the voltage on the emitter 57 to 7 volts while the voltage appearing at the rectifier 14 and applied to the first base 58 of the unijunction transistor 56 is free to rise to a certain extent. If an N of .5 is assumed and the output voltage rises above 14 volts oscillations will cease since the output voltage of the alternator appearing at the first base 58 exceeds $1/N$ times the zener voltage.

The resistor 64 and capacitor 71 are proportioned to give a repetition frequency of the relaxation oscillator 55 that is considerably higher than the frequency of the half wave rectified AC output that is applied to the terminals 45 and 51, of silicon controlled rectifier 46 from the output winding 11 of the alternator 10. The ratio between the two frequencies may be on the order of 6 to 1 at higher alternator speeds, thus causing the conduction of the controlled rectifier to occur at any time during the half wave voltage waveform that a pulse is delivered from the relaxation oscillator to the control electrode 66 of the controlled rectifier 46. This rapid pulsing of the control electrode 66 assures the conduction of the controlled rectifier 46 since if it does not fire on the first pulse due to some malfunction when the voltage of proper polarity is applied across the output electrodes, it will fire on succeeding pulses thus assuring satisfactory operation.

If it is assumed that the output voltage of the alternator 10 appearing at the rectifier 14 is below the voltage limiting value, for example, 14 volts, the pulses from the relaxation oscillator 55 will turn the silicon controlled rectifier 46 on allowing field current to flow through the field winding 41. Initially, before there is any output from the alternator 10, the field winding 41 is energized from the battery 33 through the lead 34, lead 42, resistor 43 and leads 44 and 52. At this time, with the switch 62 closed, the relaxation oscillator 55 will be in operation since the terminal voltage of the battery 33 is below the voltage limiting value. This permits current to flow through the field winding 41 and the controlled rectifier 46 since the battery 33 applies the proper voltage polarity to the controlled rectifier 46 to cause conduction.

When the alternator 10 commences to produce an output voltage, a half wave rectified voltage waveform is applied to the field winding 41 and the controlled rectifier 46 through the circuitry previously described. When this waveform falls to zero, the collapsing field of the field winding 41 is dissipated in the diode 50 and it causes a reverse voltage to be applied to the output terminals 45 and 51 of controlled rectifier 46 that bucks out any voltage that might be applied to these terminals from the battery 33 and the rectifier 14 (through the resistor 43 and the lead 44).

When the output voltage appearing at the rectifier 14 exceeds the voltage limiting value, the relaxation oscillator 55 ceases oscillation and no longer furnishes pulses to the control electrode 66 of controlled rectifier 46. As a result, the controlled rectifier 46 remains off and no field current flows through the field winding 41. This will cause the output voltage of the alternator 10 appearing at the rectifier 14 to fall and when it falls below the voltage limiting value, the oscillator 55 through the action of the unijunction transistor 56 again oscillates thereby turning on the controlled rectifier 46 and permitting current to flow through the field winding 41.

FIGURE 2 shows an alternate embodiment of the invention in which the zener diode 72 instead of being connected to ground is connected to a voltage divider circuit 81 comprised of resistor 82, variable resistor 83 and thermistor 84. This provides a means for setting the voltage limiting value or the maximum output voltage of the alternator 10 by varying the output voltage at which the zener diode 72 breaks down. This in turn varies the voltage at which the relaxation oscillator 55 ceases to oscillate. The thermistor 84 also supplies temperature compensation in accordance with well known engineering practice. With cold ambient temperatures, it is desirable to increase the output voltage of the alternator 10 to compensate for the increased internal resistance of the battery 33. The thermistor 84 in this case will increase in value since it has a negative temperature coefficient of resistance. This increase will raise the potential at the cathode of the zener diode 72 and as a result it will break down at a higher alternator output voltage thereby raising the voltage limiting value of the alternator 10.

The controlled rectifier 46, the unijunction transistor 56 and the zener diode 72 are relatively inexpensive compoments that may readily be designed into an inexpensive circuit for use with mass produced automotive vehicle generating systems. It should be noted also that in this arrangement, the switch 62 need not switch field current as is necessary in other types of voltage regulators, since when the switch 62 is open the oscillator 55 will be inoperative and this will cause the controlled rectifier 46 to come to its nonconducting state thus blocking any current flow to the field winding 41 that might otherwise occur from the battery 33 through the lead 42 and resistor 43.

The present invention thus provides a reliable and inexpensive solid state regulator that can be used with an electrical generating system of the alternator type for an automotive vehicle.

It is to be understood that this invention is not to be limited to the exact construction shown and described but that various changes and modifications may be made without departing from the spirit and scope of the invention as defined in the appended claims.

I claim:

1. In an electrical generating system, an alternator having an output winding and a control winding, a rectifier connected to said output winding for rectifying the alternating electrical energy output of said output winding, a controlled rectifier having output terminals and a control electrode, means connecting said control winding in circuit with said output terminals of said controlled rectifier for causing said controlled rectifier to control the energization of said control winding, circuit means connecting said control winding and said output terminals with said output winding of said alternator, an oscillator means having an input circuit coupled to the output of said rectifier and an output circuit coupled to said control electrode of said controlled rectifier for periodically applying to said control electrode pulses of electrical energy of a polarity and a magnitude to cause conduction of said controlled rectifier, and means connected to said input circuit of said oscillator means and the output circuit of said rectifier for causing said oscillator means to cease oscillating when the output voltage appearing at the output terminals of said rectifier exceeds a predetermined level.

2. In an electrical generating system, an alternator having an output winding and a control winding, a rectifier connected to said output winding for rectifying the alternating electrical energy output of said output winding, a controlled rectifier having output terminals and a control electrode, means connecting said control winding in circuit with said output terminals of said controlled rectifier for causing said controlled rectifier to control the energization of said control winding, circuit means connecting said control winding and said output terminals with said output winding of said alternator, an oscillator means having an input circuit coupled to the output of said rectifier and an output circuit coupled to said control electrode of said controlled rectifier for periodically applying to said control electrode pulses of electrical energy of a polarity and magnitude to cause conduction of said controlled rectifier, means connected to said input circuit of said oscillator means and the output circuit of said rectifier for causing said oscillator means to cease oscillating when the output voltage appearing at the output terminals of said rectifier exceeds a predetermined level, and adjustment means coupled to the input circuit of said oscillator means for adjusting the voltage level at which said oscillator means ceases oscillations.

3. In an electrical generating system, an alternator having an output winding and a control winding, a rectifier connected to said output winding for rectifying the alternating electrical energy output of said output winding, a controlled rectifier having output terminals and a control electrode, means connecting said control winding in circuit with said output terminals of said controlled rectifier for causing said controlled rectifier to control the energization of said control winding, circuit means connecting said control winding and said output terminals with said output winding of said alternator, an oscillator means having an input circuit coupled to the output of said rectifier and an output circuit coupled to said control electrode of said controlled rectifier for periodically applying to said control electrode pulses of electrical energy of a polarity and magnitude to cause conduction of said controlled rectifier, means connected to said input circuit of said oscillator means and the output circuit of said rectifier for causing said oscillator means to cease oscillating when the output voltage appearing at the output terminals of said rectifier exceeds a predetermined level, and temperature compensation means coupled to the input circuit of said oscillator means for varying the output voltage at which said oscillator means ceases oscillations as a function of temperature.

4. In an electrical generating system, an alternator having an output winding and a control winding, a rectifier connected to said output winding for rectifying the alternating electrical energy of said output winding, a controlled rectifier having output terminals and a control electrode, circuit means connecting said control winding in circuit with said output terminals of said controlled rectifier for causing said controlled rectifier to control the energization of said control winding, circuit means connecting said control winding and said output terminals with said output winding of said alternator, a unijunction transistor oscillator means having an output circuit coupled to said control electrode of said controlled rectifier for applying periodically to said control electrode pulses of electrical energy of a polarity and magnitude to cause conduction of said controlled rectifier, and an input circuit including an emitter electrode coupled to receive the output energy of said rectifier, and a zener diode coupled to said emitter, said zener diode being poled and having a breakdown voltage such that the voltage on said emitter is limited to a predetermined value whereby said unijunction oscillator means will cease oscillating and said controlled rectifier will cease conduction when the output voltage of said alternator appearing at said rectifier reaches a selected value that is a function of said predetermined value.

5. The combination of claim 4 in which one terminal of said zener diode is coupled to said emitter and the other terminal is connected to a voltage divider whereby the predetermined limited value of voltage on said emitter may be adjusted.

6. The combination of claim 5 in which said voltage divider includes a temperature sensitive resistor for adjusting the predetermined limited value of voltage on said emitter as a function of temperature.

7. An electrical generating system comprising, an alternator having a plurality of output windings and a control winding, a full wave rectifier connected to said output windings for rectifying the alternating electrical energy output of said output windings, said rectifier including output terminals across which appears the rectified output voltage of said alternator, a controlled rectifier having an output circuit and a control electrode, said output circuit connected in series circuit with said control winding, circuit means connecting said series circuit with one of said output windings of said alternator for periodically applying a voltage across said output circuit of said controlled rectifier in the forward conduction direction of said controlled rectifier and for periodically reducing the voltage appearing across the output circuit of said controlled rectifier to a level where said controlled rectifier may cease conduction, an oscillator having an output circuit coupled to said control electrode and an input circuit connected to sense the output voltage of said alternator appearing across the output terminals of said rectifier, said oscillator applying to said control electrode a periodically varying voltage of a polarity to cause conduction of said controlled rectifier when the output voltage of said alternator appearing across said output terminals of said rectifier is below a predetermined value, said input circuit including means for causing said oscillator to cease oscillations when the output voltage appearing across said output terminals of said rectifier exceeds said predetermined value whereby said controlled rectifier ceases conduction when the voltage appearing across the output circuit falls to a level where said controlled rectifier may cease conduction.

8. An electrical generating system comprising, an alternator having a plurality of output windings and a field winding, a full wave rectifier connected to said output windings for rectifying the alternate electrical energy output of said output windings, said rectifier including output terminals across which appears the rectified output voltage of said alternator, a controlled rectifier having an output circuit and a control electrode, said output circuit connected in series circuit with said field winding, circuit means connecting said series circuit with one of said output windings of said alternator for periodically applying a voltage across said output circuit of said controlled rectifier in the forward conduction direction of said controlled rectifier and for periodically reducing the voltage appearing across the output circuit of said controlled rectifier to a level where said controlled rectifier may cease conduction, an oscillator means having an output circuit coupled to said control electrode and an input circuit connected to sense the output voltage of said alternator appearing across the output terminals of said rectifier for applying to said control electrode a periodically varying voltage of a polarity to cause conduction of said controlled rectifier when the output voltage of said alternator appearing across said output terminals of said rectifier is below a predetermined value, and of a frequency substantially greater than the frequency of the voltage applied across the output circuit of said controlled rectifier, said input circuit including means for causing said oscillator to cease oscillations when the output voltage appearing across said output terminals of said rectifier exceeds said predetermined value whereby said controlled rectifier ceases conduction when the voltage appearing across the output circuit falls to a level where said controlled rectifier may cease conduction.

9. An electrical generating system comprising, an alternator having a plurality of output windings and a control winding, a full wave rectifier connected to said output windings for rectifiying the alternating electrical energy output of said output windings, said rectifier including output terminals across which appears the rectified output voltage of said alternator, a controlled rectifier having an output circuit and a control electrode, said output circuit connected in series circuit with said control winding, circuit means connecting said series circuit with one of said output windings of said alternator for periodically applying a voltage across said output circuit of said controlled rectifier in the forward conduction direction of said controlled rectifier and for periodically reducing the voltage appearing across the output circuit of said controlled rectifier to a level where said controlled rectifier may cease conduction, a unijunction transistor relaxation oscillator including an emitter and an output circuit connected across said output terminals of said rectifier, said output circuit connected to said control electrode of said controlled rectifier, the input circuit of said relaxation oscillator including a resistor and a capacitor connected in series circuit, said series circuit connected across the output terminals of said rectifier, the junction of said resistor and capacitor connected to the emitter of said unijunction transistor, the values of said resistor and capacitor being selected to provide an output frequency several times higher than the frequency of the voltage periodically applied across the output of said controlled rectifier, and a zener diode connected to said emitter and across said capacitor, said zener diode being poled in a direction to prevent current flow therethrough, said zener diode breaking down at a predetermined voltage level to prevent the voltage on said capacitor from rising above said predetermined level whereby said unijunction relaxation oscillator will cease oscillation when said output voltage of said alternator reaches a voltage level where the voltage applied to said zener diode exceeds the zener breakdown voltage and said controlled rectifier will cease conduction when the voltage appearing across the output circuit falls to a level where said controlled rectifier may cease conduction.

10. An electrical generating system for an automotive vehicle comprising, an alternator having a plurality of output windings and a control winding, an electrical storage battery, a full wave rectifier having input terminals connected to said output windings and output terminals connected to said storage battery, a controlled rectifier having output terminals and a control electrode, circuit means including the output terminals of said controlled rectifier and said control winding connected to one of said output windings of said alternator, a resistor, said circuit means also being connected to said output terminals of said rectifier and to said storage battery through said resistor, a unijunction transistor having a first base, a second base and an emitter electrode, a second resistor, said first base, said second base and said second resistor connected in a series circuit, said series circuit connected across the output terminals of said rectifier and said storage battery, a third resistor and a capacitor connected in series across the output terminals of said rectifier and said storage battery, the connection of said resistor and said capacitor connected to said emitter electrode, thereby forming a relaxation oscillator, the connection of said second base of said unijunction transistor and said second resistor being connected to said control electrode of said controlled rectifier, and means coupled across said capacitor and to said emitter for limiting the voltage on said emitter to a predetermined value whereby said relaxation oscillator will cease oscillations when the voltage appearing at the output terminals of said rectifier exceeds a predetermined value.

11. An electrical generating system for an automotive vehicle comprising, an alternator having a plurality of output windings and a control winding, an electrical storage battery, a full wave rectifier having input terminals connected to said output windings and output terminals connected to said storage battery, a controlled rectifier having output terminals and a control electrode, circuit means including the output terminals of said controlled rectifier and said control winding connected to one of said output windings of said alternator, a resistor, said circuit means also being connected to said output terminals of said rectifier and to said storage battery through said resistor, a unijunction transistor having a first base, a second base and an emitter electrode, a second resistor, said first base, said second base and said second resistor connected in a series circuit, said series circuit connected across the output terminals of said rectifier and said storage battery, a third resistor and a capacitor connected in series across the output terminals of said rectifier and said storage battery, the connection of said resistor and said capacitor connected to said emitter electrode, thereby forming a relaxation oscillator, the connection of said second base of said unijunction transistor and said second resistor being connected to said control electrode of said controlled rectifier, means coupled across said capacitor and to said emitter for limiting the voltage on said emitter to a predetermined value whereby said relaxation oscillator will cease oscillations when the voltage appearing at the output terminals of said rectifier exceeds a predetermined value, and a switch means positioned between said relaxation oscillator and the output terminals of said rectifier and said storage battery for deenergizing said relaxation oscillator when said switch is opened.

12. An electrical generating system for an automotive vehicle comprising, an alternator having a plurality of output windings and a control winding, an electrical storage battery, a full wave rectifier having input terminals connected to said output windings and output terminals connected to said storage battery, a controlled rectifier having output terminals and a control electrode, circuit means including the output terminals of said controlled rectifier and said control winding connected to one of said output windings of said alternator, a resistor, said circuit means also being connected to said output terminals of said rectifier and to said storage battery through said resistor, a unijuction transistor having a first base, a second base and an emitter electrode, a second resistor, said first base, said second base and said second resistor connected in a series circuit, said series circuit connected across the output terminals of said rectifier and said storage battery, a third resistor and a capacitor connected in series across the output terminals of said rectifier and said storage battery, the connection of said resistor and said capacitor connected to said emitter electrode, thereby forming a relaxation oscillator, the connection of said second base of said unijunction transistor and said second resistor being connected to said control electrode of said controlled rectifier, means coupled across said capacitor and to said emitter for limiting the voltage on said emitter to a predetermined value whereby said relaxation oscillator will cease oscillations when the voltage appearing at the output terminals of said rectifier exceeds a predetermined value, and means coupled to said next to last mentioned means for varying the limiting value of voltage on said emitter as an inverse function of temperature.

References Cited

UNITED STATES PATENTS

| | | | |
|---|---|---|---|
| 3,008,082 | 11/1961 | Schlicher | 322—28 |
| 3,106,665 | 10/1963 | Byles | 322—33 X |
| 3,151,288 | 9/1964 | Avizienis et al. | 322—28 |
| 3,173,107 | 3/1965 | Scharf et al. | 331—111 |
| 3,191,093 | 6/1965 | Morrison | 331—111 |
| 3,209,234 | 9/1965 | Bridgeman et al. | 322—28 |
| 3,214,599 | 10/1965 | Wellford | 322—28 X |
| 3,226,626 | 12/1965 | Moore | 322—32 X |
| 3,231,757 | 1/1966 | Rainer et al. | 322—28 X |
| 3,299,303 | 1/1967 | Newill et al. | 322—28 |

FOREIGN PATENTS 930,595  7/1963  Great Britain.

MILTON O. HIRSHFIELD, *Primary Examiner.*

J. J. SWARTZ, R. V. LUPO, *Assistant Examiners.*